(12) United States Patent
Wu

(10) Patent No.: US 8,842,439 B2
(45) Date of Patent: Sep. 23, 2014

(54) DISPLAY DEVICE AND HOUSING MODULE THEREOF

(75) Inventor: Chung-Wei Wu, New Taipei (TW)

(73) Assignee: Wistron Corporation, New Taipei (TW)

( * ) Notice: Subject to any disclaimer, the term of this patent is extended or adjusted under 35 U.S.C. 154(b) by 343 days.

(21) Appl. No.: 13/478,712

(22) Filed: May 23, 2012

(65) Prior Publication Data

US 2012/0229989 A1    Sep. 13, 2012

(30) Foreign Application Priority Data

Jun. 23, 2011   (TW) .............................. 100122023 A

(51) Int. Cl.
 *H05K 5/00*  (2006.01)
 *G06F 3/041* (2006.01)
 *G06F 1/16*  (2006.01)
(52) U.S. Cl.
 CPC .............. *G06F 3/041* (2013.01); *G06F 1/1601* (2013.01); *G06F 2200/1612* (2013.01); *G06F 1/1626* (2013.01); *G06F 1/1637* (2013.01)
 USPC ............................. 361/732; 361/807; 361/809
(58) Field of Classification Search
 USPC ......... 361/728–732, 752, 796, 800, 807, 809, 361/810; 312/294, 330, 334.44
 See application file for complete search history.

(56) References Cited

U.S. PATENT DOCUMENTS

| 5,446,618 A | * | 8/1995 | Tetsuya et al. | ........... 361/679.37 |
| 6,381,124 B1 | * | 4/2002 | Whitcher et al. | .......... 361/679.3 |
| 7,215,539 B2 | * | 5/2007 | Tanaka et al. | ............ 361/679.06 |
| 8,058,553 B2 | * | 11/2011 | Saito et al. | ...................... 174/60 |
| 8,605,456 B2 | * | 12/2013 | Brad | ............................. 361/787 |
| 2013/0250496 A1 | * | 9/2013 | Hara et al. | ............... 361/679.01 |

FOREIGN PATENT DOCUMENTS

TW        M280623 U    11/2005

* cited by examiner

*Primary Examiner* — Hung S Bui
(74) *Attorney, Agent, or Firm* — The Webb Law Firm

(57) ABSTRACT

A display device includes a housing unit, a display module, an electronic module and a stop mechanism. The housing unit includes a frame that has a front surface, an inner frame edge defining a window and a notch recessed from the inner frame edge. The display module includes a panel disposed at the front surface of the frame, and a display unit including a body located in the window and a lug corresponding to the notch. The stop mechanism includes a stop member disposed at the frame, and operable to switch between a locked state, where the stop member is disposed between the notch and the lug for restricting forward movement of the lug through the notch, and In a released state, where the lug is allowed to pass through the notch.

13 Claims, 6 Drawing Sheets

DISPLAY DEVICE AND HOUSING MODULE THEREOF

CROSS-REFERENCE TO RELATED APPLICATION

This application claims priority of Taiwanese Patent Application No. 100122023, filed on Jun. 23, 2011, the disclosure of which is incorporated herein by reference.

BACKGROUND OF THE INVENTION

1. Field of the Invention

The invention relates to a display device, more particularly to a technique of attaching a display module to a housing of a display device.

2. Description of the Related Art

With the rapid development of touch control techniques, more and more electronic devices (such as cellular phones and computers) are configured into touch control devices to facilitate ease operation by users.

As shown in FIG. 1, generally, a touch control electronic device 1 includes a housing frame 11, a display 12 and a touch panel 13 covering a surface of the display 12. The housing frame 11 is formed with a window 111. In conventional devices, the display 12 and the touch panel 13 are individually assembled to the housing frame 11 with the touch panel 13 adhered to a front surface of the housing frame 11 and the display 12 fastened to a back surface of the housing frame 11.

Referring to FIG. 2, in recent years, some manufacturers integrate the display 12 with the touch panel 13 beforehand so that, once the touch panel 13 is adhered to the front surface of the housing frame 11, the display 12 is attached to the housing frame 11 as well. As the touch panel 13 is adhered to the front surface of the housing frame 11, the display 12 is passed through the window 111. Due to the inclusion of lugs 121 in existing specifications of displays 12, the housing frame 11 must be formed with corresponding notches 112 at an inner edge thereof so that, the housing frame 11 does not hinder passing of the lugs 121 when the touch panel 13 is adhered to the front surface of the housing frame 11. However, the configuration above is prone to the following problem. Since the display 12 and the touch panel 13 are attached to the housing frame 11 merely by adhering the touch panel 13 to the front surface of the housing frame 11, the display 12 may fall out of the housing frame 11 together with the touch panel 13 due to poor adhesion between the touch panel 13 and the housing frame 11, or due to shock or impact by an external force.

SUMMARY OF THE INVENTION

Therefore, an object of the present invention is to provide a solution for the problem that a display and a touch panel are prone to drop out of a frame.

According to this invention, a display device includes a housing unit, a display module, an electronic module and a stop mechanism. The housing unit includes a frame. The frame has a front surface, an inner frame edge and a notch recessed in the inner frame edge. The inner frame edge defines a window. The display module includes a panel and a display unit. The panel is disposed on the front surface of the frame. The display unit includes a body that is located in the window of the frame, and a lug corresponding to the notch. The electronic module is disposed at the housing unit and electrically connected to the display module. The stop mechanism includes a stop member disposed on the frame. The stop member is operable to switch between a locked state and a released state. In the locked state, the stop member is disposed between the notch and the lug for restricting forward movement of the lug through the notch. In the released state, the lug is allowed to pass through the notch.

Furthermore, the panel is a touch panel adhered to the front surface of the frame, and the display unit is attached to the touch panel.

Furthermore, the stop mechanism further includes a positioning protrusion protruding outwardly of the frame. The stop member is formed with a positioning hole. When the stop member is in the locked state, the positioning protrusion is engaged in the positioning hole.

Furthermore, the positioning protrusion has a bump for engaging in the positioning hole.

Furthermore, the frame further has a back surface. The stop mechanism further includes a positioning post protruding outwardly of the back surface of the frame. The positioning protrusion protrudes outwardly of the back surface of the frame. The stop member is disposed on the positioning post. The positioning post and the positioning protrusion are respectively located at two opposite sides of the notch. In the locked state, the stop member is located behind the notch.

Furthermore, the stop mechanism further includes a fastener. The stop member is fastened to the positioning post via the fastener.

Furthermore, the fastener is a screw.

The effect of the present invention is that, by providing the stop mechanism, when the display module is assembled and attached to the frame, the stop mechanism restricts the lug of the display unit from moving forwards and passing through the notch, thereby preventing the display unit from moving forwards together with the panel and dropping out of the frame so as to maintain stability of the assembly of the display module and the frame.

BRIEF DESCRIPTION OF THE DRAWINGS

The above-mentioned and other technical contents, features, and effects of this invention will be clearly presented from the following detailed description of the embodiment in coordination with the reference drawings, of which.

DETAILED DESCRIPTION OF THE PREFERRED EMBODIMENT

Figure 1:
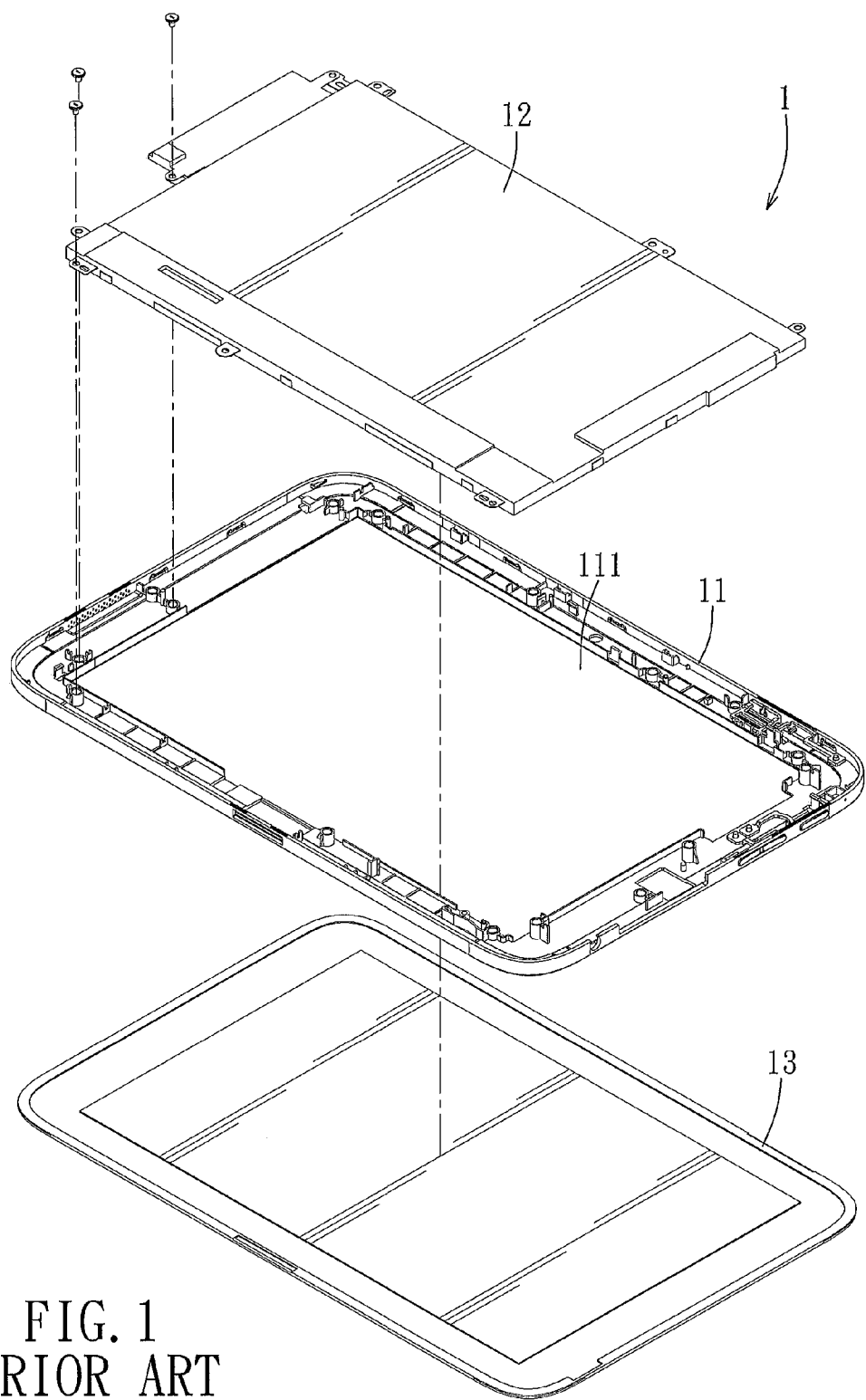
FIG. 1 is a schematic view illustrating assembly of a conventional touch control electronic device.
Figure 2:
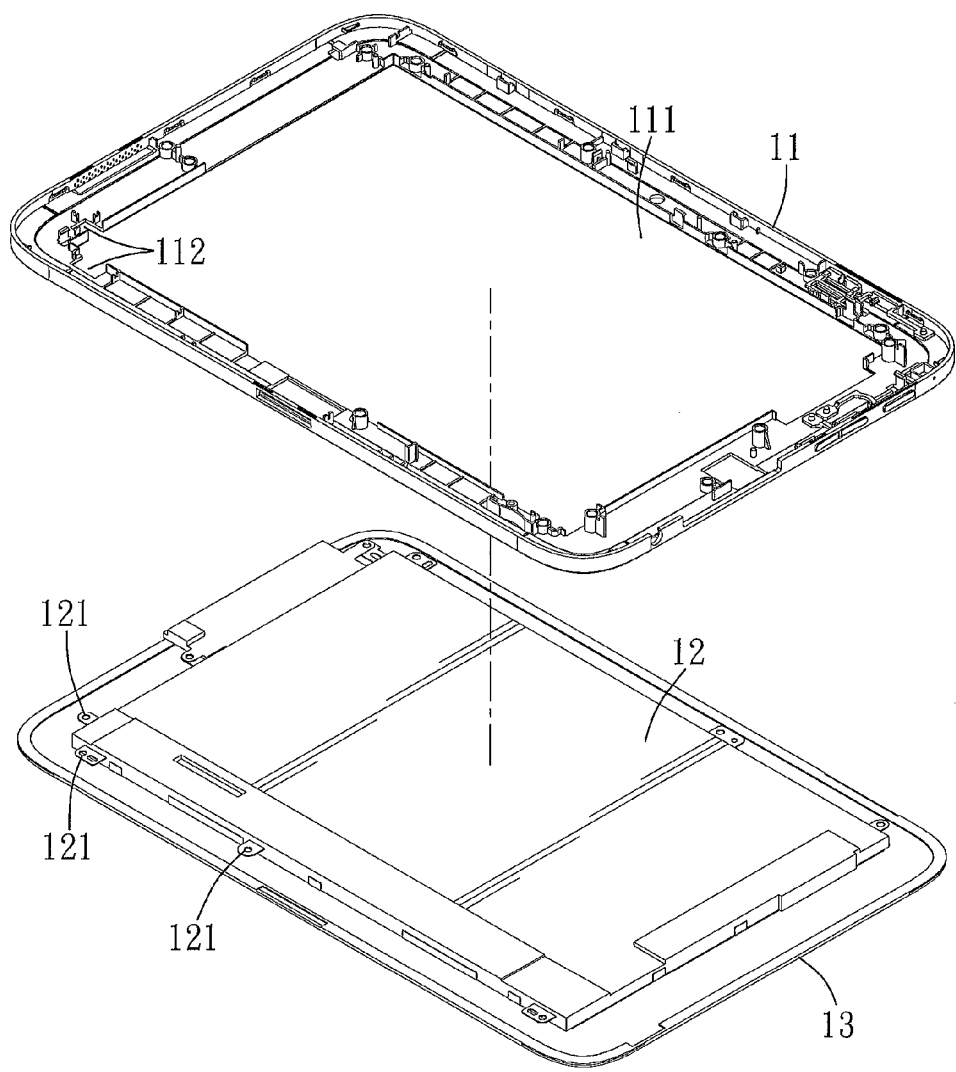
FIG. 2 is another schematic view illustrating the assembly of the conventional touch control electronic device.
Figure 3:
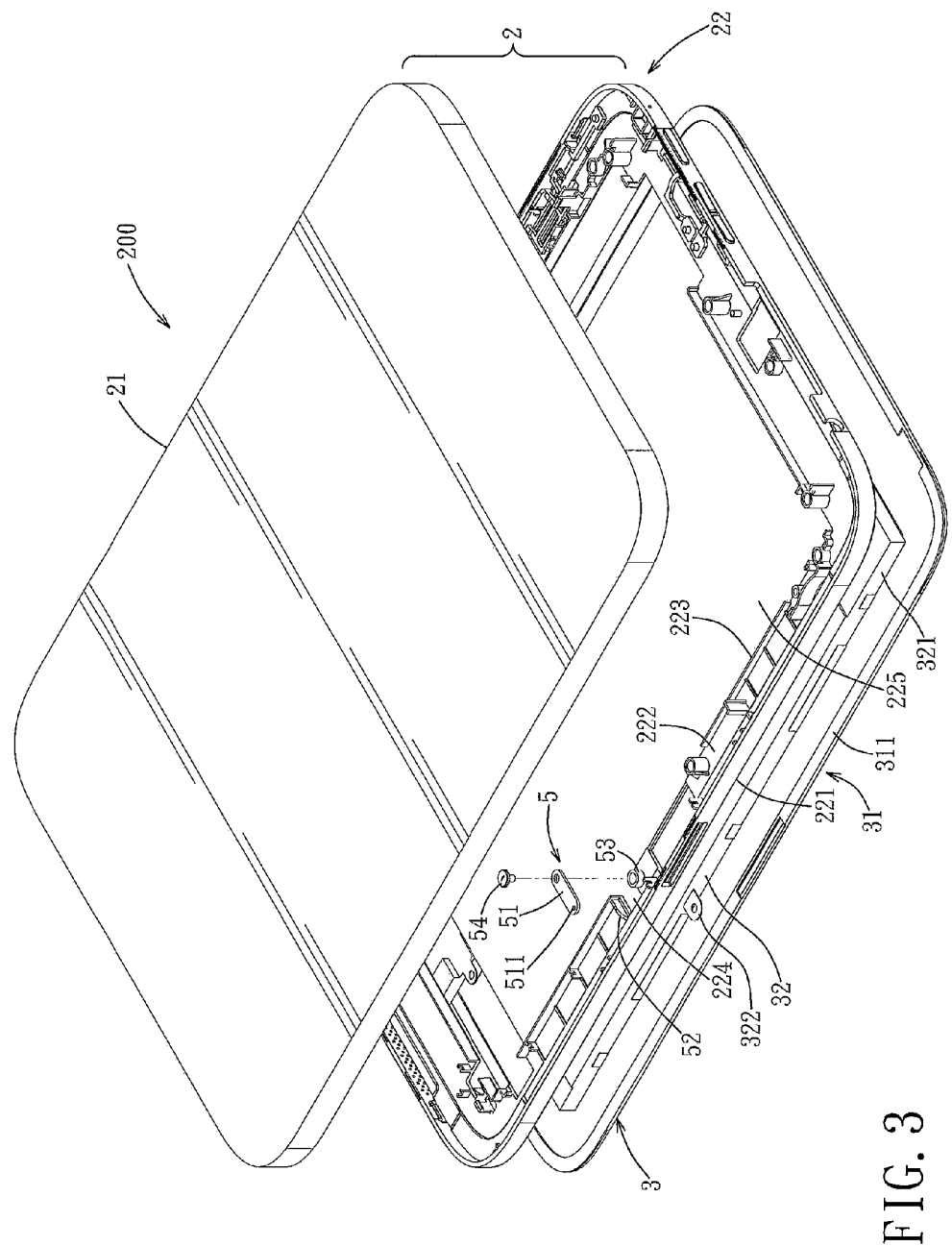
FIG. 3 is a perspective view of a display device according to an embodiment of the present invention.

Referring to FIG. 3, in an embodiment of the present invention, a display device 200 includes a housing unit 2, a display module 3, an electronic module (not shown) and a stop mechanism 5. The housing unit 2 and the stop mechanism 5 form a housing module of the display device 200 for assembling with and attaching to the display module 3. In this embodiment, the display device 200 is a tablet computer with a touch control function.

The housing unit 2 includes a rear cover 21 and a frame 22 that are attachable with each other. The frame 22 has a front surface 221, a back surface 222, an inner frame edge 223 and a notch 224. The inner frame edge 223 surrounds and defines a window 225. The notch 224 is recessed in the inner frame edge 223 and in communication with the window 225.

The display module 3 includes a panel 31 and a display unit 32. In this embodiment, the panel 31 is a touch panel. If the display device 200 is a display without a touch control function, the panel 31 may, for example, be a glass/plastic board that is transparent and that can protect the display unit 32. The display unit 32 is, for example, a light-emitting diode (LED) display panel or a liquid crystal display (LCD) panel, and includes a body 321 and a lug 322 protruding outwardly of the body 321. The lug 322 referred to herein may be a protruding tab formed at a housing of a backlight module of the display panel and conventionally used for fastening the frame 22. Alternatively, the lug 322 may be other protruding parts of the display unit 32. The display unit 32 is attached to a back surface of the panel 31. The panel 31 has a profile greater than the display unit 32. Thus, when the display unit 32 is attached to the panel 31, a part of the panel 31 that is not overlapped with the display unit 32 forms an outer peripheral part 311 surrounding the display unit 32.

In practice, as the display module 3 is attached to the housing unit 2, the outer peripheral part 311 of the panel 31 is moved in a rearward direction so as to be adhered to the front surface 221 of the frame 22, and the body 321 of the display unit 32 moves rearwards to pass through the window 225 of the frame 22 while the lug 322 of the display unit 32 moves rearwards to pass through the notch 224 of the frame 22.

The electronic module is disposed between the rear cover 21 and the frame 22 of the housing unit 2, and is electrically connected to the display module 3. The electronic module referred to herein includes electronic components, circuit components, driving circuits as well as other elements that enable operation of the tablet computer.

The stop mechanism 5 is used for stopping the lug 322 of the display unit 32 from moving forwards when the display module 3 is assembled with and attached to the frame 22, thereby preventing the display unit 32 from moving forwards together with the panel 31 and detaching from the frame 22 due to poor adhesion between the outer peripheral part 311 of the panel 31 and the front surface 221 of the frame 22 or due to shock or impact caused by an external force.

It should be noted that, the stop mechanism 5 may be provided corresponding to the notch 224. In this embodiment, the cooperation among a single stop mechanism 5, a single lug 322 and a single notch 224 is taken as an example for demonstration. When the display unit 32 includes a plurality of lugs 322 and the frame 22 is formed with a plurality of notches 224 respectively corresponding to the lugs 322, a stop mechanism 5 may be provided at a location corresponding to each of the notches 224.

Figure 4:
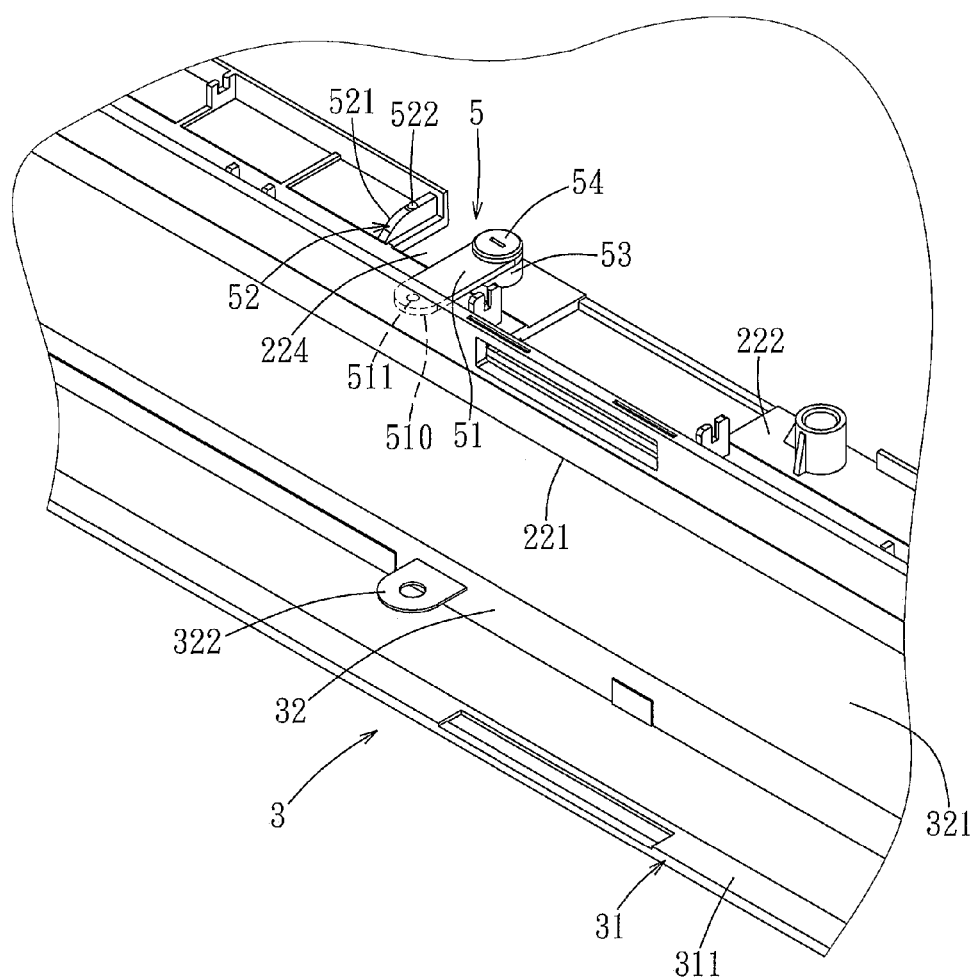
FIG. 4 is a fragmentary perspective view of the embodiment of the present invention, in which a stop member is in a released state.
Figure 5:
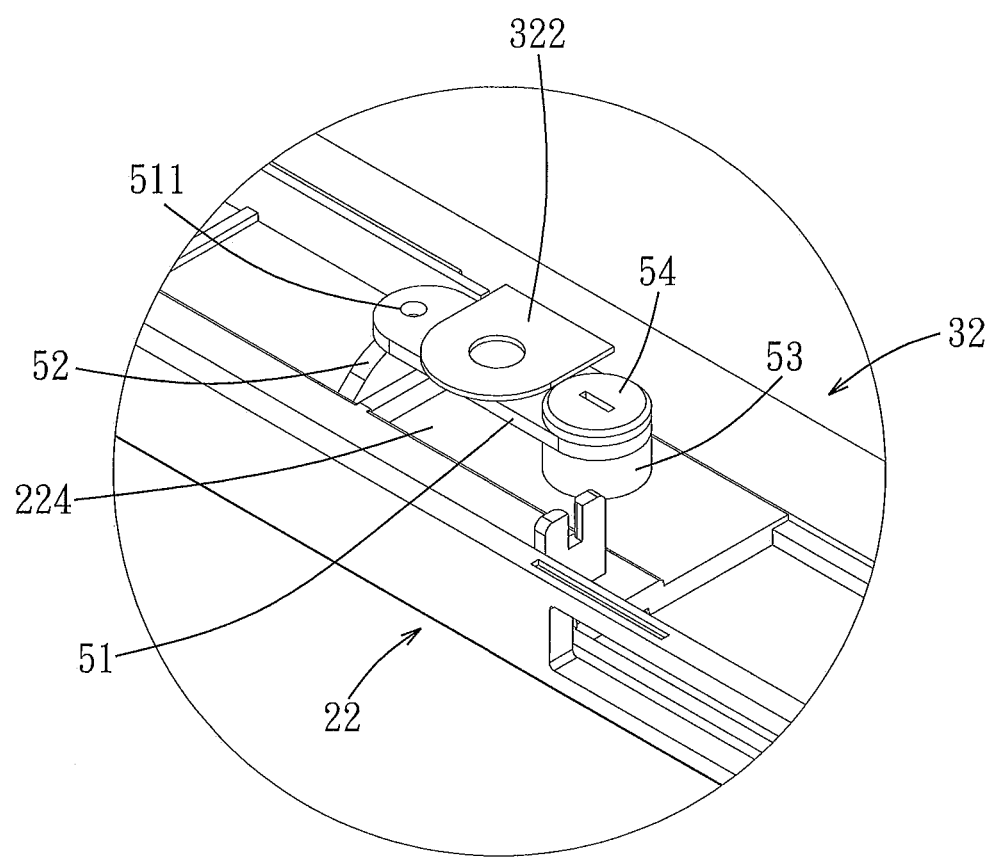
FIG. 5 is a fragmentary perspective view of the embodiment of the present invention, in which the stop member is in a locked state.

Referring to FIGS. 3 to 5, the stop mechanism 5 includes a stop member 51. The stop member 51 is operable to move between a locked state (as shown in FIG. 5) and a released state (as shown in FIG. 4). In the locked state, the stop member 51 is located between the lug 322 of the display unit 32 and the notch 224 of the frame 22, and stops the lug 322 of the display unit 32 from moving forwards so as to prevent the lug 322 from moving forwards and passing through the notch 224. In the released state, the stop member 51 is no longer located rearwards of the notch 224 so that the lug 322 is not blocked from passing through the notch 224. In this embodiment, the stop member 51 includes a strip-shaped stop tab 510 movable between the locked and released states. The stop member 51 is not to be limited in outer appearance and structural configuration as long as it can be mounted to the back surface 222 of the frame 22 and can serve the function of hindering movement of the lug 322.

With the provision of the stop member 51, when it is intended to assemble and attach together the display module 3 and the frame 22 of the housing unit 2 in the rearward direction, the stop tab 510 of the stop member 51 is first maintained in the released state. Next, the outer peripheral part 311 of the panel 31 is adhered to the front surface 221 of the frame 22 such that the body 321 of the display unit 32 passes through the window 225 of the frame 22 in the rearward direction, and such that the lug 322 passes through the notch 224 to be located rearwards of the notch 224. Subsequently, as shown in FIG. 5, the stop tab 510 of the stop member 51 is moved to and maintained in the locked state between the notch 224 of the frame 22 and the lug 322 so as to stop movement of the lug 322, thereby preventing the display unit 32 from detaching from the frame 22 together with the panel 31 with the body 321 of the display unit 32 moving forwardly and falling out through the window 225. In this invention, the locked state of the stop member 51 is not limited to that shown herein where the stop tab 510 of the stop member 51 is located between the lug 322 and the notch 224, and may refer to a state in which the stop member 51 and the lug 322 are interfered structurally with each other so as to restrict the lug 322 from moving forwards and passing through the notch 224.

More specifically, the stop mechanism 5 in this embodiment further includes a positioning post 53 protruding outwardly of the back surface 222 of the frame 22. The stop tab 510 of the stop member 51 is rotatably disposed at an end of the positioning post 53.

More specifically, the stop mechanism 5 in this embodiment further includes a fastener 54. The fastener 54 may be, for example, a screw or other fastening element that can position the stop tab 510 of the stop member 51 at the positioning post 53. The stop tab 510 of the stop member 51 is fastened to the positioning post 53 via the fastener 54 which extends therethrough so as to be operable to rotate between the locked state and the released state. In this embodiment, the stop tab 510 of the stop member 51 is fastened at one end thereof to the positioning post 53 before the display module 3 is assembled to the frame 22, and is maintained in the released state. It is only after the display module 3 is assembled to the frame 22 that the stop tab 510 of the stop member 51 is rotated to the locked state. Certainly, the stop tab 510 of the stop member 51 may also be fastened to the positioning post 53 after the display module 3 is assembled with the frame 22. The manner in which the stop member 51 is positioned at the positioning post 53 is not limited to using the fastener 54, and may also be implemented using structural cooperation between the stop tab 510 of the stop member 51 and the positioning post 53. Alternatively, the stop tab 510 of the stop member 51 itself may have a structure that mates with the frame 22 so as to engage directly the frame 22 and that facilitates movement of the stop tab 510 relative to the frame 22.

Figure 6:
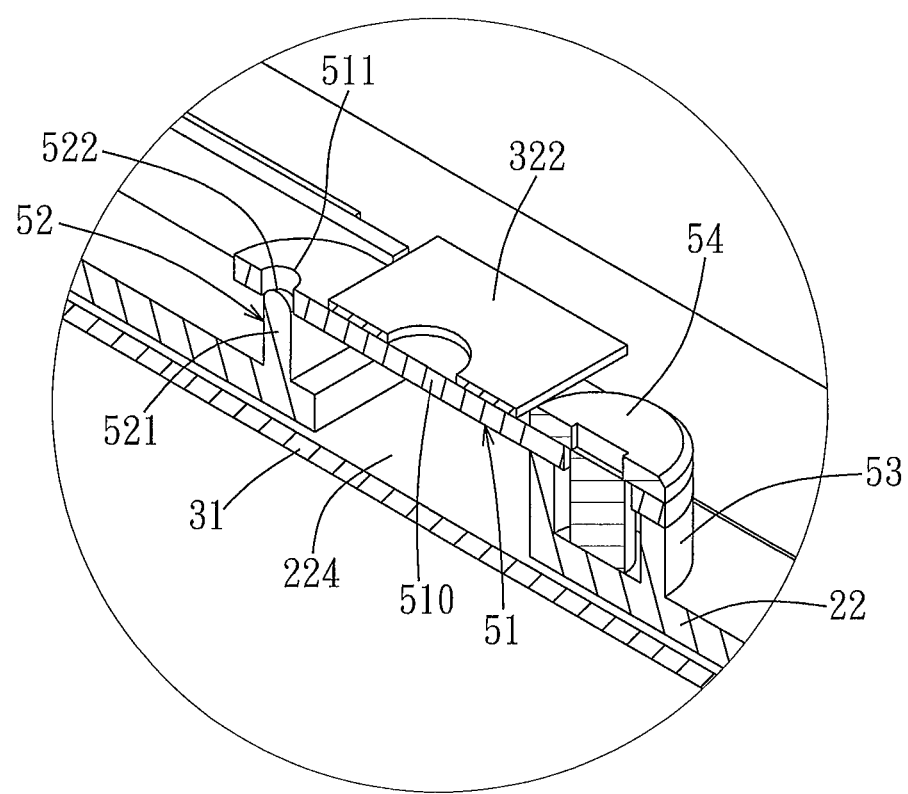
FIG. 6 is a fragmentary cross-sectional perspective view of the embodiment of the present invention, in which the stop member is in the locked state.

Referring to FIGS. 4-6, furthermore, in order to maintain the stop tab 510 of the stop member 51 at the locked state, the stop mechanism 5 in this embodiment further includes a positioning protrusion 52 has a positioning hole 511 formed in the stop tab 510 at another end thereof opposite to said one end that is fastened to the positioning post 53. The positioning hole 511 may be a through hole penetrating through the stop tab 510 or a recess hole recessed in a bottom surface of the stop tab 510. The positioning protrusion 52 includes a rib 521 protruding outwardly of the back surface 222 of the frame 22 and a bump 522 protruding from the rib 521. The positioning protrusion 52 and the positioning post 53 are respectively located at two opposite sides of the notch 224. Thus, when the stop tab 510 of the stop member 51 is rotated to the locked state, the bump 522 of the positioning protrusion 52 is engaged in the positioning hole 511. In this case, the stop tab 510 of the stop member 51 can no longer easily rotate relative to the frame 22, and requires assertion of a force to a certain extent in order to remove the bump 522 of the positioning protrusion 52 from the positioning hole 511.

It should be noted that the locations of the positioning protrusion 52 and the positioning hole 511 mentioned above may be interchanged, that is, with the positioning protrusion 52 disposed at the stop member 51 and the positioning hole 511 formed in the frame 22.

To sum up, with the provision of the stop mechanism 5, when the display module 3 is assembled and attached to the frame 22, the stop mechanism 5 may be disposed in the locked state so as to prevent the lug 322 of the display unit 32 from moving forwards and passing through the notch 224, thereby restricting the display unit 32 from moving forwards together with the panel 31 and dropping out of the frame 22 so as to maintain stability of the assembly of the display module 3 and the frame 22, and achieve the objects of the present invention.

While the present invention has been described in connection with what is considered the most practical and embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A display device, comprising:
   a housing unit including a frame that has a front surface, an inner frame edge defining a window and a notch recessed in said inner frame edge;
   a display module including
      a panel that is disposed on said front surface of said frame, and
      a display unit that includes a body disposed in said window of said frame and a lug corresponding to said notch;
   an electronic module disposed at said housing unit and electrically connected to said display module; and
   a stop mechanism including a stop member that is disposed on said frame, wherein said stop member is operable to switch between a locked state, where said stop member is located between said notch and said lug for restricting forward movement of said lug through said notch, and a released state, where said lug is allowed to pass through said notch.

2. The display device of claim 1, wherein said panel is a touch panel adhered to said front surface of said frame, and said display unit is attached to said touch panel.

3. The display device of claim 2, wherein said stop mechanism further includes a positioning protrusion protruding outwardly of one of said frame and said stop member, the other of said frame and said stop member is formed with a positioning hole, and when said stop member is in the locked state, said positioning protrusion is engaged in said positioning hole.

4. The display device of claim 3, wherein said positioning protrusion has a bump for engaging in said positioning hole.

5. The display device of claim 3, wherein said frame further has a back surface, said stop mechanism further including a positioning post that protrudes outwardly of said back surface of said frame, said positioning protrusion protruding outwardly of said back surface of said frame, said stop member being disposed on the positioning post, said positioning post and said positioning protrusion being respectively located at two opposite sides of said notch, said stop member being located rearwardly of said notch when disposed in the locked state.

6. The display device of claim 5, wherein said stop mechanism further includes a fastener and said stop member is fastened to said positioning post via said fastener.

7. The display device of claim 6, wherein said fastener is a screw.

8. A housing module for a display device adapted for assembling with and attaching to a panel and a display unit of the display device that are assembled together, the display unit including a lug, the housing module of the display device comprising:
   a housing unit including a frame that has a front surface, an inner frame edge defining a window and a notch recessed in said inner frame edge; and
   a stop mechanism including a stop member that is disposed on said frame, wherein said stop member is operable to switch between a locked state, where said stop member is disposed between said notch and said lug for restricting forward movement of said lug through said notch, and in a released state, where said lug is allowed to pass through said notch.

9. The housing module of the display device of claim 8, the panel being a touch panel to be adhered to said front surface of said frame, the display unit being attached to the touch panel, wherein said stop mechanism further includes a positioning protrusion protruding outwardly of one of said frame and said stop member, the other one of said frame and said stop member is formed with a positioning hole, and when said stop member is in the locked state, said positioning protrusion is engaged in said positioning hole.

10. The housing module of the display device of claim 9, wherein said positioning protrusion has a bump for engaging in said positioning hole.

11. The housing module of the display device of claim 9, wherein said frame further has a back surface, said stop mechanism further including a positioning post that protrudes outwardly of said back surface of said frame, said positioning protrusion protruding outwardly of said back surface of said frame, said stop member being disposed on said positioning post, said positioning post and said positioning protrusion being respectively located at two opposite sides of said notch, said stop member being located rearwardly of said notch when disposed in the locked state.

12. The housing module of the display device of claim 11, wherein said stop mechanism further includes a fastener, and said stop member is fastened to said positioning post via said fastener.

13. The housing module of the display device of claim 12, wherein said fastener is a screw.

* * * * *